(12) United States Patent
Tepper et al.

(10) Patent No.: US 11,640,295 B2
(45) Date of Patent: May 2, 2023

(54) SYSTEM TO ANALYZE AND ENHANCE SOFTWARE BASED ON GRAPH ATTENTION NETWORKS

(71) Applicant: Intel Corporation, Santa Clara, CA (US)

(72) Inventors: Mariano Tepper, Portland, OR (US); Bryn Keller, Vancouver, WA (US); Mihai Capota, Portland, OR (US); Vy Vo, Portland, OR (US); Nesreen Ahmed, Santa Clara, CA (US); Theodore Willke, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 80 days.

(21) Appl. No.: 16/913,756

(22) Filed: Jun. 26, 2020

(65) Prior Publication Data

US 2020/0326934 A1 Oct. 15, 2020

(51) Int. Cl.
*G06F 8/75* (2018.01)
*G06N 3/08* (2006.01)
*G06N 3/04* (2006.01)

(52) U.S. Cl.
CPC .............. *G06F 8/75* (2013.01); *G06N 3/0445* (2013.01); *G06N 3/08* (2013.01)

(58) Field of Classification Search
CPC ........... G06F 8/75; G06N 3/0445; G06N 3/08
USPC ........................................................ 717/123
See application file for complete search history.

(56) References Cited

U.S. PATENT DOCUMENTS

| | | | | |
|---|---|---|---|---|
| 4,710,872 A | * | 12/1987 | Scarborough | ............. G06F 8/45 717/160 |
| 10,409,560 B1 | * | 9/2019 | Bebee | ...................... G06F 8/311 |
| 2011/0263238 A1 | * | 10/2011 | Riley | .................... H04M 15/00 455/418 |
| 2014/0258997 A1 | * | 9/2014 | Lim | ........................ G06F 8/443 717/151 |
| 2019/0354567 A1 | * | 11/2019 | Dehghani | ................ G06N 3/04 |

(Continued)

OTHER PUBLICATIONS

Kuck et al., "Dependence Graphs and Compiler Optimizations," Department of Computer Science, University of Illinois at Urbana-Champaign, Urbana, Illinois, 1981, pp. 207-218.

(Continued)

*Primary Examiner* — Chat C Do
*Assistant Examiner* — Bradford F Wheaton
(74) *Attorney, Agent, or Firm* — Jordan IP Law, LLC

(57) ABSTRACT

Systems, apparatuses and methods may provide for technology that generates a dependence graph based on a plurality of intermediate representation (IR) code instructions associated with a compiled program code, generates a set of graph embedding vectors based on the plurality of IR code instructions, and determines, via a neural network, one of an analysis of the compiled program code or an enhancement of the program code based on the dependence graph and the set of graph embedding vectors. The technology may provide a graph attention neural network that includes a recurrent block and at least one task-specific neural network layer, the recurrent block including a graph attention layer and a transition function. The technology may also apply dynamic per-position recurrence-halting to determine a number of recurring steps for each position in the recurrent block based on adaptive computation time.

21 Claims, 6 Drawing Sheets

(56) References Cited

U.S. PATENT DOCUMENTS

| | | | |
|---|---|---|---|
| 2020/0081909 A1* | 3/2020 | Li | G06F 16/345 |
| 2020/0273525 A1* | 8/2020 | Doller | G06F 3/0604 |
| 2021/0056076 A1* | 2/2021 | Yin | G06F 16/2237 |
| 2021/0110277 A1* | 4/2021 | D'Souza | G06N 3/0454 |
| 2021/0133577 A1* | 5/2021 | Srinivasan | G06N 3/063 |

OTHER PUBLICATIONS

LLVM, "Dependence Graphs in LLVM," retrieved from <llvm.org/docs/DependenceGraphs/index.html>, Jul. 12, 2021, 5 pages.

Bojanowski et al., "Enriching Word Vectors with Subword Information," Computation and Language, arXiv:1607.046062, Jun. 19, 2017, 12 pages.

Keerthy S et al., "A Flow Analysis Based Scalable Infrastructure for Program Encodings," arXiv preprint arXiv:1909.06228, Jan. 1, 2020, 23 pages.

Ben-Nun et al., "Neural Code Comprehension: A Learnable Representation of Code Semantics," 32nd Conference on Neural Information Processing Systems, Montreal Canada, 2018, 13 pages.

Velickovic et al., "Graph Attention Networks", arXiv preprint arXiv:1710.10903, Department of Computer Science and Technology, University of Cambridge, Feb. 4, 2018, 12 pages.

Vaswani et al., "Attention Is All You Need", 31st Conference on Neural Information Processing Systems, Long Beach, CA USA, 2017, 11 pages.

PyTorch geometric, "Torch Geometric LLVM", retrieved from <pytorch-geometric.readthedocs.io/en/latest/modules/nn.html#module-torch_geometric.nn.conv.message_passing>, Jul. 12, 2021, 98 pages.

Dehghani et al., "Universal Transformers", arXiv preprint arXiv:1807.03819, ICLR, Mar. 5, 2019 23 pages.

Graves et al., "Adaptive Computation Time for Recurrent Neural Networks", Google DeepMind, arXiv preprint arXiv:1603.08983, Feb. 21, 2017, 19 pages.

Ba et al., "Layer Normalization", arXiv preprint arXiv:1607.06450, University of Toronto, Jul. 21, 2016, 14 pages.

Chollet et al., "Xception: Deep Learning with Depthwise Seperable Convolutions," Google, Inc., arXiv preprint arXiv:1610.02357, Apr. 4, 2017, 8 pages.

Salimans et al., "Evolution Strategies as a Scalable Alternative to Reinforcement Learning", arXiv preprint arXiv:1703.03864, Sep. 7, 2017, 13 pages.

Uchida et al., "Embedding Watermarks into Deep Neural Networks", KDDI Research, Inc., arXiv:1701.04082v2, 2017 ACM on International Conference on Multimedia Retrieval. ACM, New York, NY, USA, 10 pages.

LLVM, "Analysis and Transform Passes", retrieved from <llvm.org/docs/Passes.html>, Jul. 15, 2021, 20 pages.

Alon et al., "Code2vec: Learning Distributed Representations of Code", arXiv: 1803.09473v5, Oct. 30, 2018, 30 pages.

Allamanis et al., "Minig Source Code Repositories at Massive Scale using Language Modeling", 2013 10th Working Conference on Mining Software Repositories (MSR), 2013, 10 pages.

Santos et al., "Syntax and Sensibility: Using Language Models to Detect and Correct Syntax Errors", 2018 IEEE 25th International Conference on Software Analysis, Evolution and Reengineering, 2018, pp. 311-322.

Levy et al., "Learning to Align the Source Code to the Compiled Object Code", 34th International Conference on Machine Learning, Sydney, Australia, 2017, 9 pages.

Katz et al., "Using Recurrent Neural Networks for Decompilation", Technical Research Papers, 34th International Conference on Machine Learning—vol. 70, 2018, Campobasso Italy, pp. 346-356.

Tramer et al., "Stealing Machine Learning Models via Prediction APIs", arXiv:1609.02943v2, 25th USENIX Security Symposium, Oct. 3, 2016,19 pages.

Oh et al., "Towards Reverse-Engineering Black-Box Neural Networks", arXiv:1711.01768v3, International Conference an Learning Representations (ICLR), Feb. 14, 2018, 20 pages.

* cited by examiner

SYSTEM TO ANALYZE AND ENHANCE SOFTWARE BASED ON GRAPH ATTENTION NETWORKS

TECHNICAL FIELD

Embodiments generally relate to technology for computing systems. More particularly, embodiments relate to technology to analyze and enhance computer software programs.

BACKGROUND

The amount of software is rapidly growing, and its use permeates everyday life. However, in many cases, code is generated by software developers that do not possess the technical knowledge and/or the time to write it in a failure-proof, highly optimized manner. There is also an exponential increase in malignant software, and detecting it automatically is paramount. Thus, automatically analyzing and/or optimizing code is an emerging problem of critical importance.

Other approaches have drawbacks. For example, approaches that rely on deterministic algorithms rather than a learning approach are limited by the number, variety and effectiveness of heuristics that can be applied. As another example, approaches that work with source code rather than machine code require that the source code is available. In yet another example, approaches that rely on natural language processing methods have trouble dealing with structural features such as function calls, branching, and the interchangeable order of statements and are unable to make full use of the graphical structure present in the code.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

In general, embodiments provide a computing system that automatically analyzes and enhances computer program code using a graph attention neural network. Embodiments also provide for analyzing computer program code and return useful information about the code, such as software classification (e.g., malicious code detection), thread coarsening analysis, or heterogeneous scheduling analysis. Additionally, embodiments provide for improving runtime execution of computer program code through code modification, such as via loop vectorization and optimization pass ordering. Embodiments also include technology to perform any type of manipulation from an instruction-level granularity to any desired coarser level (e.g., loops, functions, modules, classes, etc.). Thus, embodiments will automatically enhance program execution or automatically identify and classify certain types of program code.

Figures 1, 2:
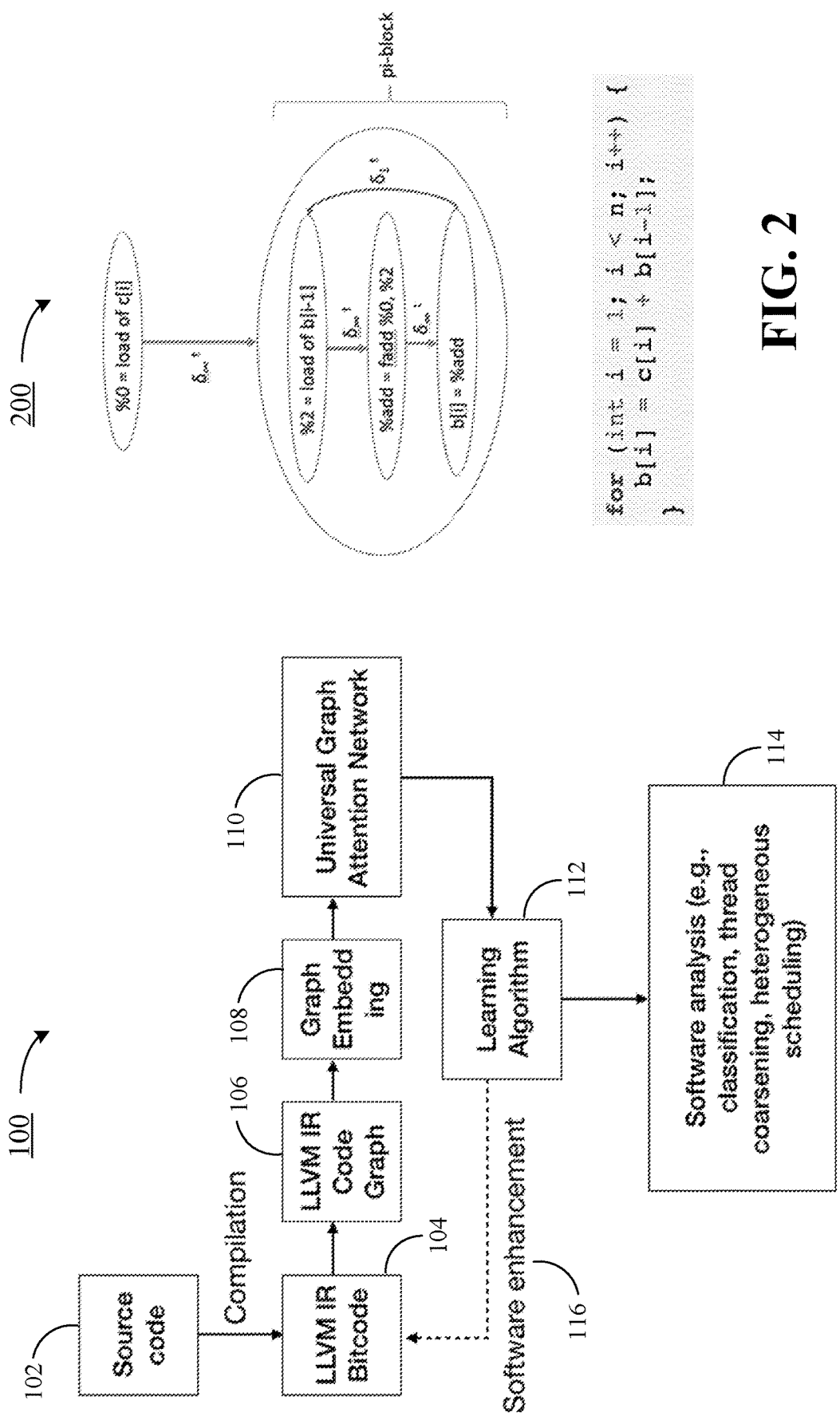
FIG. 1 is a block diagram illustrating an example of a system for analyzing and enhancing computer program code according to one or more embodiments.
FIG. 2 is a diagram illustrating example data dependencies between individual instructions.

More particularly, embodiments of the computing system provide for generating a dependence graph based on a plurality of machine code instructions, generating a set of embedding vectors based on the plurality of machine code instructions, and inputting the dependence graph and the set of embedding vectors to a graph attention neural network to determine an analysis of the compiled program code or an enhancement of the program code. FIG. 1 is a block diagram illustrating an example of a computing system 100 for analyzing and enhancing computer program code according to one or more embodiments, with reference to components and features described herein including but not limited to the figures and associated description. The system 100 may receive source code 102 and compile the source code into intermediate representation (IR) code 104. In some embodiments, the system may receive machine code 104 already in compiled form. As illustrated in FIG. 1, in some embodiments the compiled code 104 may include LLVM intermediate representation (LLVM-IR) bitcode. In other embodiments, the code 104 may include compiled intermediate representation code other than LLVM-IR bitcode, such as, e.g., IR bitcode produced by another compiler. The IR code 104 may be stored in a memory (not shown) for further processing.

As shown in FIG. 1, a dependence graph 106 may be generated from the IR code 104. The dependence graph 106 may be based, e.g., on dependence graph techniques provided by LLVM for LLVM IR bitcode. In some embodiments, other dependence graph techniques may be applied. A set of graph embedding vectors 108 may be generated based on the IR code 104, and input to the graph attention neural network 110 (which may be a Universal Graph Attention Network, described in more detail herein). Through learning algorithm(s) 112, the graph attention neural network 110 may be trained to handle tasks such as software analysis (label 114), in which the system automatically extracts information about the software (such as, e.g., classifying as malicious code), or software enhancement (label 116), in which the system modifies the LLVM-IR bitcode to improve the software runtime performance. Examples of software analysis may include a software classification analysis, a thread coarsening analysis, or a heterogeneous scheduling analysis. Examples of software enhancement may include program modifications to improve performance via loop vectoring and/or optimization pass ordering.

Graph Creation Module

Dependencies between instructions may be mapped via a dependence graph (such as dependence graph 106 in FIG. 1, already discussed). Some embodiments may use a dependence graph known as the Data Dependence Graph (DDG) to map dependencies between instructions. In a DDG, the Table 1 shows a set of LLVM-IR elements in the LLVM-IR instruction set for which embedding vectors may be generated:

| Operations | | | | | | Types | Arguments |
|---|---|---|---|---|---|---|---|
| add | extractelement | fptoui | landingpad | sdiv | switch | Float | Constant |
| alloca | extractvalue | fptrunc | load | select | trunc | Integer | Function |
| and | fadd | fscub | lshr | sext | udiv | Pointer | Label |
| ashr | fcmp | getelementptr | mul | shl | uitofp | Struct | Pointer |
| atomicrmw | fdiv | icmp | or | shufflevector | unreachable | Vector | Variable |
| bitcast | fence | insertelement | phi | sitofp | urem | Void | |
| br | fmul | insertvalue | ptrtoint | srem | xor | | |
| call | fpext | inttoptr | resume | store | zext | | |
| cmpxchg | fptosi | invoke | ret | sub | | | | graph represents data dependencies between individual instructions. Each node in a DDG graph represents a single instruction and is referred to as an "atomic" node. It is also possible to combine some atomic nodes that have a simple def-use dependency between them into larger nodes (known as pi-blocks) that contain multiple instructions. An illustration of an example of data dependency in a DDG is provided in FIG. 2 (see https://llvm.org/docs/DependenceGraphs/index.html). As shown in FIG. 2, a sample set of code contains a statement that has a loop carried dependence on itself creating a cycle in the DDG. The graph 200 shows how the cycle of dependency is carried through multiple def-use relations and a memory access dependency. The cycle of dependency is carried through multiple def-use relations and a memory access dependency.

In some embodiments, a dependence graph known as the Program Dependence Graph (PDG) may be used to map dependencies between instructions. A PDG has a similar structure as the DDG, but it is capable of representing both data dependencies and control-flow dependencies between program elements such as instructions, groups of instructions, basic blocks or groups of basic blocks. PDG is the preferred dependence graph. In alternative embodiments, other dependence graphs may be used to map dependencies between instructions.

Embedding Module

A set of graph embedding vectors (such as embedding vectors 108 in FIG. 1, already discussed) may be computed, one vector for each intermediate representation (IR) code instruction (e.g., each LLVM-IR instruction) of the input program (i.e., IR code 104 in FIG. 1, already discussed). According to embodiments, a compositional embedding may be used that has a key feature of being generalizable to unseen instructions. Referring to LLVM-IR instructions for purposes of illustration, since all LLVM-IR instructions are composed of common elements, by creating individual embedding vectors for these elements and composing them, generalization may be achieved. This technique is analogous to word embeddings that are composed from n-grams. The embedding vectors are generated independently from the dependence graph (e.g., PDG). Generation of embedding vectors, however, are part of the trainable elements in the neural network (trainable through backpropagation). Since training involves using dependence graphs (e.g., PDG), after training, the values of these embedding vectors will be influenced by the collection of the PDG graphs seen during training. Once trained, the neural network will be tuned to the selected task.

As shown in Table 1, there are 53 operations, 6 types and 5 arguments for the LLVM-IR instructions, making a total of 64 elements. For each of these 64 elements, an embedding vector may be generated. In embodiments, the dimensionality of the vectors may be a user-tunable parameter of the system.

As an example, embedding vector generation may be illustrated for the LLVM-IR instruction:

store i32% a, i32* % a.addr, align 4

This instruction sets the 32 bit integer pointed to by % a.addr to the 32 bit value in address % a. The "align 4" parameter ensures that the address will be a multiple of 4. According to an embodiment, this instruction may first be translated into an abstracted compositional format (CF), which may take many forms. A particular example of the CF for this instruction may be as shown in Table 2:

| Operation | Arg1 | Type of Arg1 | Arg2 | Type of Arg2 | Alignment |
|---|---|---|---|---|---|
| store | Variable | Integer | Pointer | Integer | 4 |

The values for the CF in Table 2 are obtained from entries in Table 1. As shown in Table 2, there are six elements for the example LLVM-IR "store" instruction. In some embodiments, the alignment information may be discarded. A composition function may be used to create a single embedding vector from the five individual elements (disregarding the alignment information). This compositional vector will be referred to as an instruction-level vector (ILV).

Figure 3:
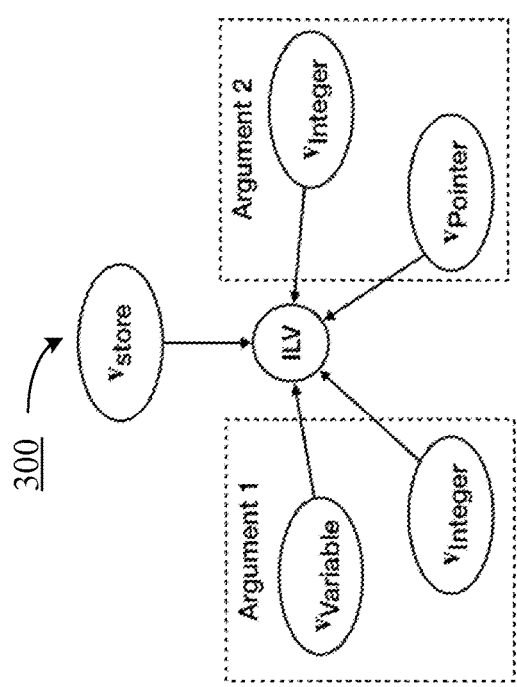
FIG. 3 is a diagram illustrating an example of a graph for an instruction-level vector according to one or more embodiments.

In some embodiments, as shown in FIG. 3 the LLVM-IR "store" instruction may be modeled as a "star graph" 300 in which the vector (ILV) is illustrated as the central node, with each surrounding neighbor node representing an embedding vector for one of the CF values from Table 2: $v_{store}$ (instruction), $V_{variable}$ and $v_{integer}$ (argument 1), $v_{pointer}$ and $v_{integer}$ (argument 2). A trainable graph attention layer may be used to summarize the information of the ILV neighbors (i.e., the embedding vectors of the individual elements) into the ILV by passing messages from the neighbors to the central node.

Universal Graph Attention Module

According to embodiments, a graph attention neural network (e.g., graph attention neural network 110 in FIG. 1, already discussed) may receive input from the graph creation module (which generates a dependence graph for the program bitcode) and the embedding module (which generates an ILV for each of the instructions in the program bitcode). More particularly, the input to the graph attention neural network may be (a) the function $\mathcal{N}$ which denotes the function that, given a node in the dependence graph, returns its neighbors, and (b) a collection of ILVs $\{v_i\}_{i=1}^n$ which denotes the collection of instruction-level vectors (described herein with reference to FIG. 3) for the instructions in the program bitcode. A graph attention layer (GAT) may be applied to compute a weighted average of the embedding vectors of each nodes' vectors, followed by a nonlinearity. Applying a graph attention layer (GAT), the output of each node is computed by:

$$v_i' = \text{nonlinearity}\left(\sum_{j \in N(i)} \alpha_j v_j\right)$$

where $\alpha_j$ may represent a weight (or attention) given to each vector $v_j$. In embodiments, the nonlinearity may take different forms, depending on the algorithm or task. In embodiments, a multi-headed graph attention mechanism may be employed. In some embodiments, the graph neural network may be implemented in a field programmable gate array (FPGA) accelerator. In an embodiment, the graph neural network may be implemented in a combination of a processor and a FPGA accelerator.

Embodiments may use a graph neural network architecture that includes a graph attention layer (GAT) followed by a transition function. Any instantiation of a GAT may be used. A key feature of this architecture, termed Universal Graph Attention (UGAT), is that its depth may be determined automatically and independently for every input. A UGAT combines the parallelizability and malleability of GATs with the recurrent inductive bias of recurrent neural networks (RNNs). A dynamic per-position recurrence-halting mechanism may be used, resulting in a variable and self-tunable depth for every node in the graph. Dynamic halting is achieved using Adaptive Computation Time (ACT), an algorithm that allows recurrent neural networks to learn how many computational steps to take between receiving an input and emitting an output. ACT requires minimal changes to the network architecture and is deterministic and differentiable, allowing for training using backpropagation.

Figure 4:
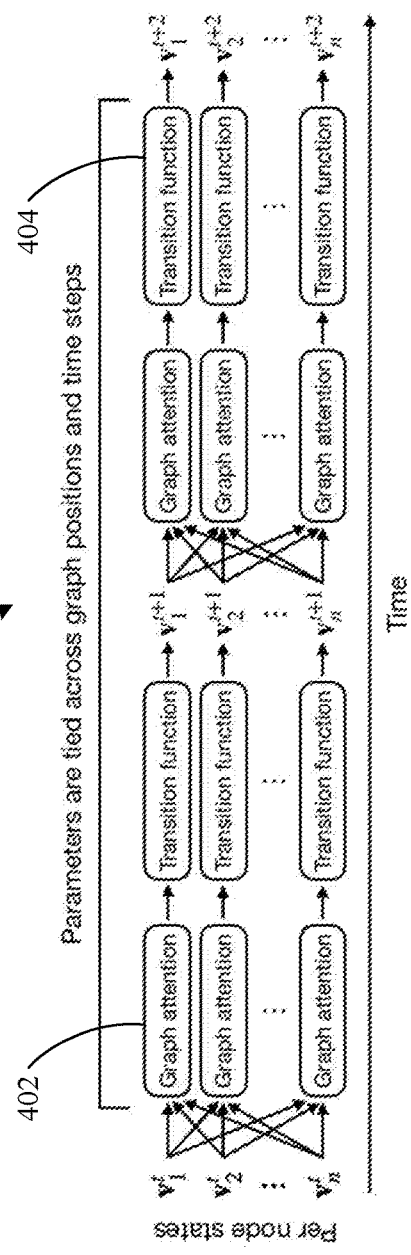
FIG. 4 provides a diagram illustrating aspects of an example of a graph attention neural network according to one or more embodiments.

FIG. 4 illustrates recurrent processing stages 400 for an example of a graph attention neural network (e.g., graph attention neural network 110 in FIG. 1, already discussed) according to one or more embodiments, with reference to components and features described herein including but not limited to the figures and associated description. As shown in FIG. 4, a UGAT repeatedly refines a collection of vector representations for each node in the graph in parallel, by combining information from different positions using a graph attention stage 402 and applying a recurrent transition function 404 across time steps $1 \leq t \leq T$. In FIG. 4 this process is illustrated over two recurrent time steps, where arrows are shown to denote dependencies between operations. Initially every vector $v^0$ (for t=0) is initialized with the embedding for each instruction in the graph. Neural network parameters are tied across graph positions and time steps. With dynamic halting, the number of recurrent steps T may be independently determined for each instruction.

Figure 5:
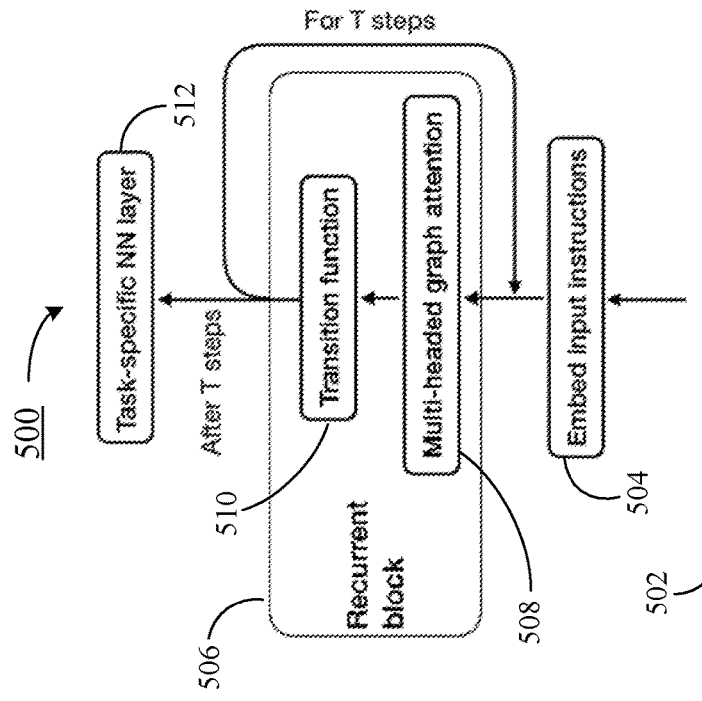
FIG. 5 provides a diagram illustrating a recurrent block for an example of a graph attention neural network according to one or more embodiments.

FIG. 5 provides a diagram 500 illustrating a recurrent block for an example of a graph attention neural network (e.g., graph attention neural network 110 in FIG. 1, already discussed) according to one or more embodiments, with reference to components and features described herein including but not limited to the figures and associated description. The processing flow illustrated in FIG. 5 may proceed similarly to the flow in FIG. 1, already discussed. At label 502, a dependency graph may be generated based on input IR instructions (e.g., LLVM-IR bitcode). At label 504, embedding vectors may be generated for the instructions in the input IR code. Recurrent block 506 for the UGAT may process the input dependency graph information and the embedding vectors via a recurrent stage by applying a GAT 508 (which may be a multi-headed GAT) and a transition function 510, similar to the illustration in FIG. 4, already discussed. After T steps, the output of the recurrent block may be processed by one or more task-specific neural network layers 512. In general, the neural network layers 512 may take the form of a few fully connected layers, separated by nonlinearities, such as, for example, rectified linear units (ReLUs). The number of recurrent steps, T, may be determined for each position individually via dynamic halting using adaptive computation time.

As illustrated in FIGS. 4 and 5, the UGAT computes revised representations $V^t \in \mathbb{R}^{n \times d}$ where each row is one of the ILV vectors $v_i^t \in \mathbb{R}^d$. This computation is performed by iterating the equations:

$$H^t = \text{LayerNorm}(A^t + \text{Transition}(A^t))$$

$$A^t = \text{LayerNorm}(H^{t-1} + \text{GraphAttention}(H^{t-1}))$$

which employ the layer normalization function LayerNorm. The transition function may be any differentiable function that takes an input vector and returns an output vector of the same dimension as the input. In most embodiments, the transition function (i.e., transition function 404 in FIG. 4 and/or transition function 510 in FIG. 5, already discussed) may be a fully-connected neural network, applied position-wise, i.e. individually to each row of $A^t$.

Learning Module

The learning module (e.g., learning algorithm 112 in FIG. 1, already discussed) is used during training and is specific for the task or application at hand. In some embodiments, the learning module may include use of a training neural network trained for classification or for regression. In the case of a classification task, the learning module may take the form a cross-entropy loss function to assess whether the output matches the class label or not. In the case of a code performance enhancement task, the learning module may take the form of a regression loss function (e.g., mean squared error (MSE) loss) that penalizes worst performances (such as, e.g., longer running times) and favors better performances (e.g., shorter running times). In such case, the unoptimized program may be used as a baseline for the loss. In some embodiments, the learning module may include a deep reinforcement learning agent trained using a reward mechanism that favors solving the task at hand. For example, the deep reinforcement learning agent could receive a high reward when it classifies the software correctly or when it achieves runtime acceleration.

The system may be trained end-to-end using standard deep learning algorithms (e.g., backpropagation or natural evolution strategies). In any setting, training requires a database of software. Labeled examples may or may not be required, depending on the task and the chosen learning technique. The training database would need to be representative for the type of software programs that would be expected to be encountered during inference.

Figure 6:
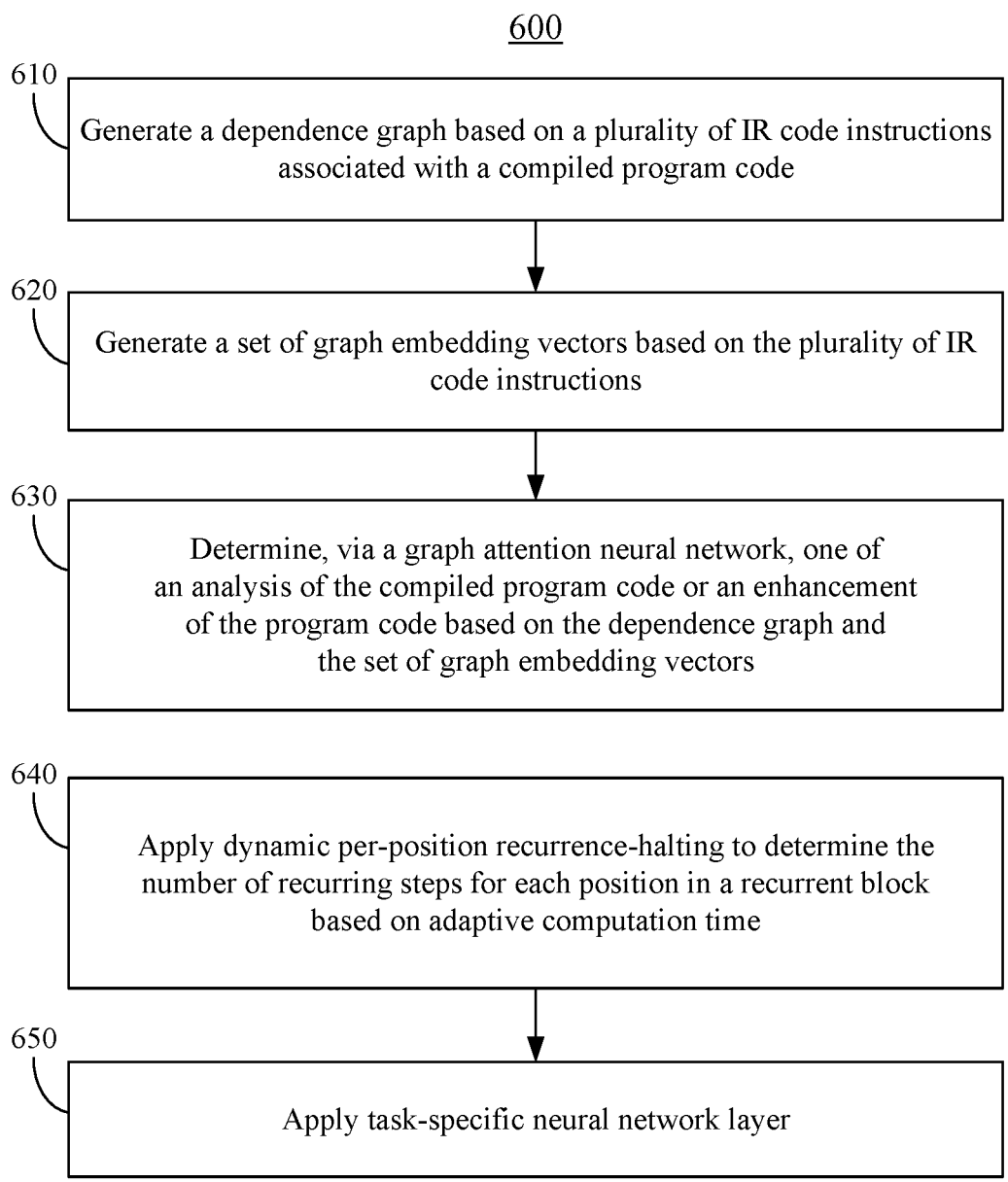
FIG. 6 provides a flowchart illustrating operation of an example of a system for analyzing and enhancing computer program code according to one or more embodiments.

FIG. 6 is a flowchart illustrating a process 600 for operating an example of a system for analyzing and enhancing computer program code according to one or more embodiments, with reference to components and features described herein including but not limited to the figures and associated description. The process 600 may be implemented in the computing system 100 described herein with reference to FIG. 1, already discussed. More particularly, the process 600 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in process 600 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Turning to FIG. 6, illustrated processing block 610 provides for generating a dependence graph based on a plurality of IR code instructions associated with a compiled program code. Illustrated processing block 620 provides for generating a set of graph embedding vectors based on the plurality of IR code instructions. Illustrated processing block 630 provides for determining, via a graph attention neural network, one of an analysis of the compiled program code or an enhancement of the program code based on the dependence graph and the set of graph embedding vectors. The graph attention neural network includes a recurrent block (e.g., recurrent block 506 in FIG. 5, already discussed) and a task-specific neural network layer (e.g., layer 512 in FIG. 5, already discussed). The recurrent block includes a graph attention layer and a transition function (e.g., layer 508 and transition function 510 in FIG. 5, already discussed). The number of recurring steps for each position in the recurrent block is determined automatically. Examples of an analysis of the compiled program code may include a software classification analysis, a thread coarsening analysis, or a heterogeneous scheduling analysis. Examples of an enhancement of the program code may include program modifications to improve performance via at least one of loop vectoring or optimization pass ordering.

Illustrated processing block 640 provides for applying dynamic per-position recurrence-halting to determine the number of recurring steps for each position in a recurrent block based on adaptive computation time. Illustrated processing block 650 provides for applying one or more task-specific neural network layers. Illustrated processing block 640 and/or illustrated processing block 650 may be performed as part of the process of illustrated processing block 630.

Figure 7:
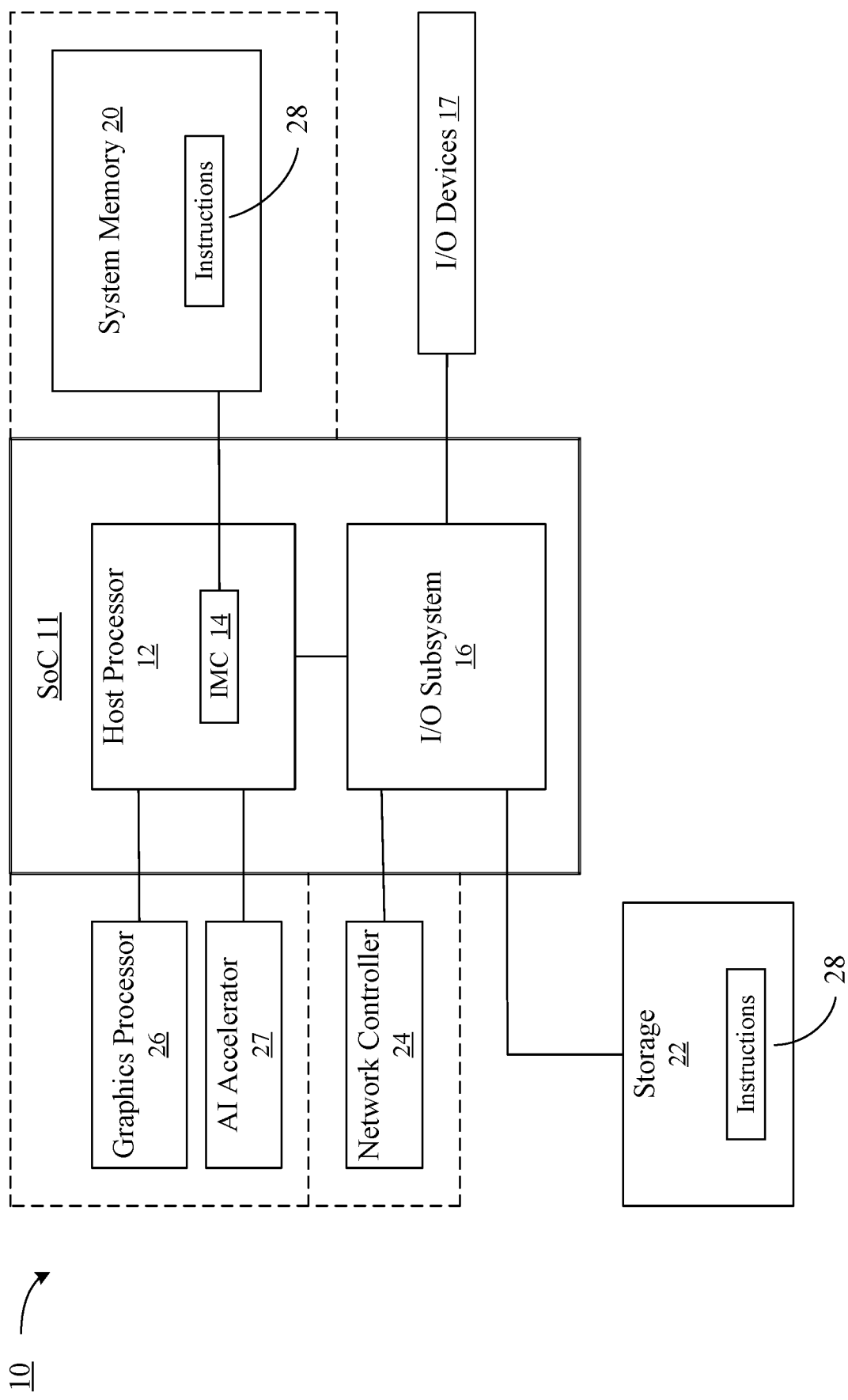
FIG. 7 is a block diagram illustrating an example of a performance-enhanced computing system according to one or more embodiments.

FIG. 7 shows a block diagram illustrating an example computing system 10 for analyzing and enhancing computer program code according to one or more embodiments, with reference to components and features described herein including but not limited to the figures and associated description. The system 10 may generally be part of an electronic device/platform having computing and/or communications functionality (e.g., server, cloud infrastructure controller, database controller, notebook computer, desktop computer, personal digital assistant/PDA, tablet computer, convertible tablet, smart phone, etc.), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof. In the illustrated example, the system 10 may include a host processor 12 (e.g., central processing unit/CPU) having an integrated memory controller (IMC) 14 that may be coupled to system memory 20. A host processor 12 may include any type of processing device, such as, e.g., microcontroller, microprocessor, RISC processor, ASIC, etc., along with associated processing modules or circuitry. The system memory 20 may include any non-transitory machine- or computer-readable storage medium such as RAM, ROM, PROM, EEPROM, firmware, flash memory, etc., configurable logic such as, for example, PLAs, FPGAs, CPLDs, fixed-functionality hardware logic using circuit technology such as, for example, ASIC, CMOS or TTL technology, or any combination thereof suitable for storing instructions 28.

The system 10 may also include an input/output (I/O) subsystem 16. The I/O subsystem 16 may communicate with for example, one or more input/output (I/O) devices 17, a network controller 24 (e.g., wired and/or wireless NIC), and storage 22. The storage 22 may be comprised of any appropriate non-transitory machine- or computer-readable memory type (e.g., flash memory, DRAM, SRAM (static random access memory), solid state drive (SSD), hard disk drive (HDD), optical disk, etc.). The storage 22 may include mass storage. In some embodiments, the host processor 12 and/or the I/O subsystem 16 may communicate with the storage 22 (all or portions thereof) via the network controller 24. In some embodiments, the system 10 may also include a graphics processor 26 (e.g., graphics processing unit/GPU) and an AI accelerator 27. In an embodiment, system 10 may also include a vision processing unit (VPU), not shown.

The host processor 12 and the I/O subsystem 16 may be implemented together on a semiconductor die as a system on chip (SoC) 11, shown encased in a solid line. The SoC 11 may therefore operate as a computing apparatus for analyzing and enhancing computer software programs. In some embodiments, the SoC 11 may also include one or more of the system memory 20, the network controller 24, the graphics processor 26 and/or the AI accelerator 27 (shown encased in dotted lines). In some embodiments, the SoC 11 may also include other components of the system 10.

The host processor 12, the I/O subsystem 16, the graphics processor 26, the AI accelerator 27 and/or the VPU may execute program instructions 28 retrieved from the system memory 20 and/or the storage 22 to perform one or more aspects of the process 600 as described herein with reference to FIG. 6. Thus, execution of the instructions 28 may cause the SoC 11 to generate a dependence graph based on a plurality of intermediate representation (IR) code instructions associated with a compiled program code, generate a set of graph embedding vectors based on the plurality of IR code instructions, and determine, via a graph attention neural network, one of an analysis of the compiled program code or an enhancement of the program code based on the dependence graph and the set of graph embedding vectors. The system 10 may implement one or more aspects of the computing system 100, the graph creation module, the embedding module, the universal graph attention module, and/or the learning module as described herein with reference to FIGS. 1-5. The system 10 is therefore considered to be performance-enhanced at least to the extent that the system automatically and adaptively analyzes and/or enhances performance of computer program code.

Computer program code to carry out the processes described above may be written in any combination of one or more programming languages, including an object-oriented programming language such as JAVA, JAVASCRIPT, PYTHON, SMALLTALK, C++ or the like and/or conventional procedural programming languages, such as the "C" programming language or similar programming languages, and implemented as program instructions 28. Additionally, the program instructions 28 may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, microprocessor, etc.).

The I/O devices 17 may include one or more of input devices, such as a touch-screen, keyboard, mouse, cursor-control device, touch-screen, microphone, digital camera, video recorder, camcorder, biometric scanners and/or sensors; input devices may be used to enter information and interact with system 10 and/or with other devices. The I/O devices 17 may also include one or more of output devices, such as a display (e.g., touch screen, liquid crystal display/LCD, light emitting diode/LED display, plasma panels, etc.), speakers and/or other visual or audio output devices. Input and/or output devices may be used, e.g., to provide a user interface.

Figure 8:
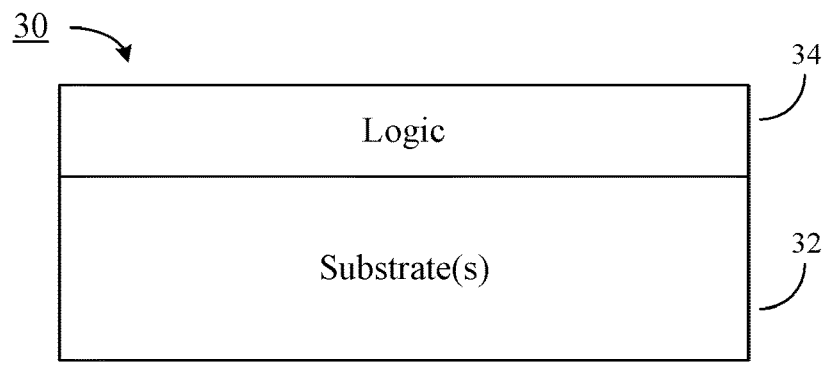
FIG. 8 is a block diagram illustrating an example semiconductor apparatus according to one or more embodiments.

FIG. 8 shows a block diagram illustrating an example semiconductor apparatus 30 for analyzing and enhancing computer program code according to one or more embodiments, with reference to components and features described herein including but not limited to the figures and associated description. The semiconductor apparatus 30 may be implemented, e.g., as a chip, die, or other semiconductor package. The semiconductor apparatus 30 may include one or more substrates 32 comprised of, e.g., silicon, sapphire, gallium arsenide, etc. The semiconductor apparatus 30 may also include logic 34 comprised of, e.g., transistor array(s) and other integrated circuit (IC) components) coupled to the substrate(s) 32. The logic 34 may be implemented at least partly in configurable logic or fixed-functionality logic hardware. The logic 34 may implement the system on chip (SoC) 11 described above with reference to FIG. 7. The logic 34 may implement one or more aspects of the processes described above, including the process 600 to generate a dependence graph based on a plurality of intermediate representation (IR) code instructions associated with a compiled program code, generate a set of graph embedding vectors based on the plurality of IR code instructions, and determine, via a graph attention neural network, one of an analysis of the compiled program code or an enhancement of the program code based on the dependence graph and the set of graph embedding vectors as described herein with reference to FIG. 6. The logic 34 may implement one or more aspects of the computing system 100, the graph creation module, the embedding module, the universal graph attention module, and/or the learning module as described herein with reference to FIGS. 1-5. The apparatus 30 is therefore considered to be performance-enhanced at least to the extent that the system automatically and adaptively analyzes and/or enhances performance of computer program code.

The semiconductor apparatus 30 may be constructed using any appropriate semiconductor manufacturing processes or techniques. For example, the logic 34 may include transistor channel regions that are positioned (e.g., embedded) within substrate(s) 32. Thus, the interface between the logic 34 and the substrate(s) 32 may not be an abrupt junction. The logic 34 may also be considered to include an epitaxial layer that is grown on an initial wafer of the substrate(s) 34.

Figure 9:
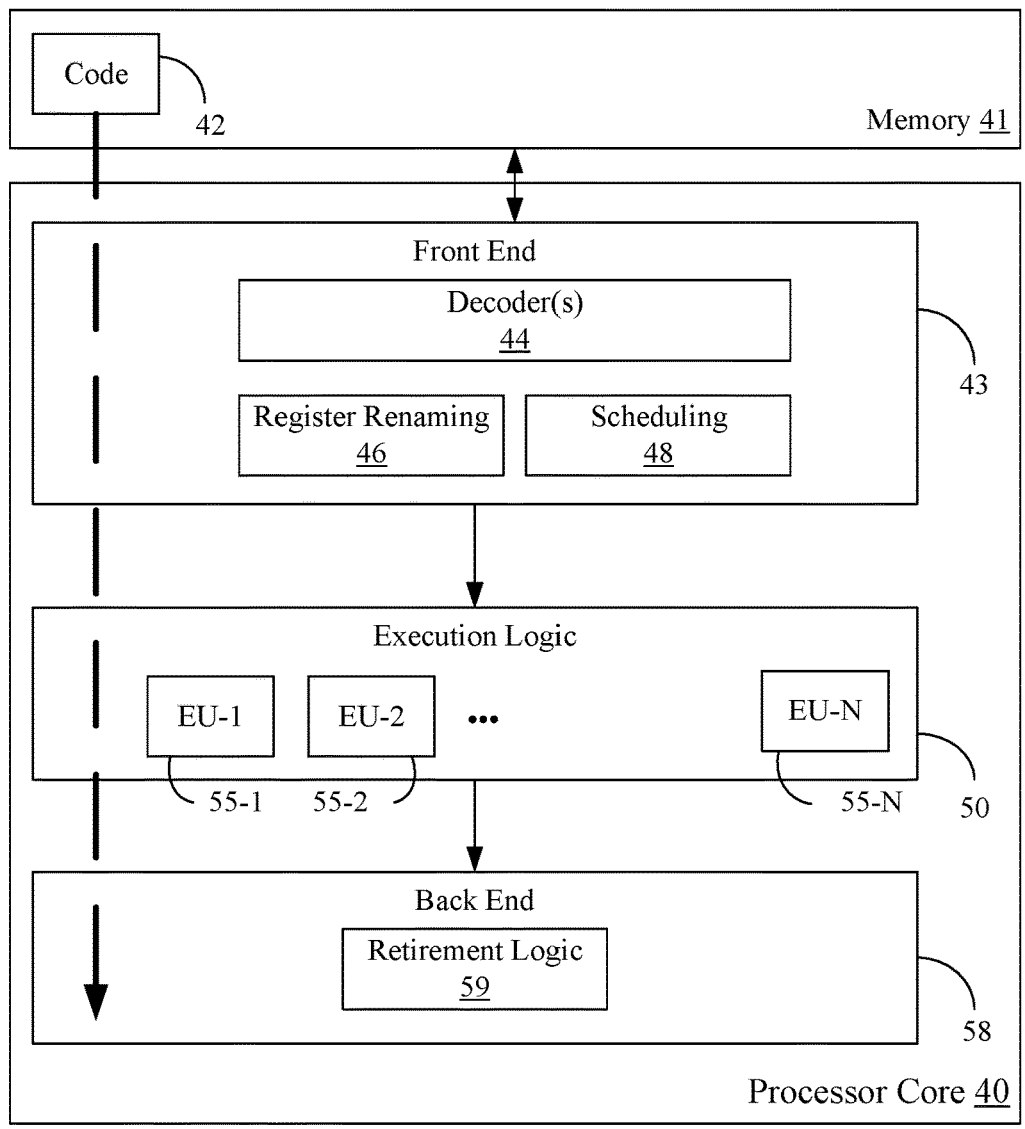
FIG. 9 is a block diagram illustrating an example of a processor according to one or more embodiments.

FIG. 9 is a block diagram illustrating an example processor core 40 according to one or more embodiments, with reference to components and features described herein including but not limited to the figures and associated description. The processor core 40 may be the core for any type of processor, such as a micro-processor, an embedded processor, a digital signal processor (DSP), a network processor, or other device to execute code. Although only one processor core 40 is illustrated in FIG. 9, a processing element may alternatively include more than one of the processor core 40 illustrated in FIG. 9. The processor core 40 may be a single-threaded core or, for at least one embodiment, the processor core 40 may be multithreaded in that it may include more than one hardware thread context (or "logical processor") per core.

FIG. 9 also illustrates a memory 41 coupled to processor core 40. The memory 41 may be any of a wide variety of memories (including various layers of memory hierarchy) as are known or otherwise available to those of skill in the art. The memory 41 may include one or more code 42 instruction(s) to be executed by the processor core 40. The code 42 may implement one or more aspects of the process 600 as described herein with reference to FIG. 6. The processor core 40 may implement one or more aspects of the computing system 100, the graph creation module, the embedding module, the universal graph attention module, and/or the learning module as described herein with reference to FIGS. 1-5. The processor core 40 follows a program sequence of instructions indicated by the code 42. Each instruction may enter a front end portion 43 and be processed by one or more decoders 44. The decoder 44 may generate as its output a micro operation such as a fixed width micro operation in a predefined format, or may generate other instructions, microinstructions, or control signals which reflect the original code instruction. The illustrated front end portion 43 also includes register renaming logic 46 and scheduling logic 48, which generally allocate resources and queue the operation corresponding to the convert instruction for execution.

The processor core 40 is shown including execution logic 50 having a set of execution units 55-1 through 55-N. Some embodiments may include a number of execution units dedicated to specific functions or sets of functions. Other embodiments may include only one execution unit or one execution unit that can perform a particular function. The illustrated execution logic 50 performs the operations specified by code instructions.

After completion of execution of the operations specified by the code instructions, back end logic 58 retires the instructions of the code 42. In one embodiment, the processor core 40 allows out of order execution but requires in order retirement of instructions. Retirement logic 59 may take a variety of forms as known to those of skill in the art (e.g., re-order buffers or the like). In this manner, the processor core 40 is transformed during execution of the code 42, at least in terms of the output generated by the decoder, the hardware registers and tables utilized by the register renaming logic 46, and any registers (not shown) modified by the execution logic 50.

Although not illustrated in FIG. 9, a processing element may include other elements on chip with the processor core 40. For example, a processing element may include memory control logic along with the processor core 40. The processing element may include I/O control logic and/or may include I/O control logic integrated with memory control logic. The processing element may also include one or more caches.

Figure 10:
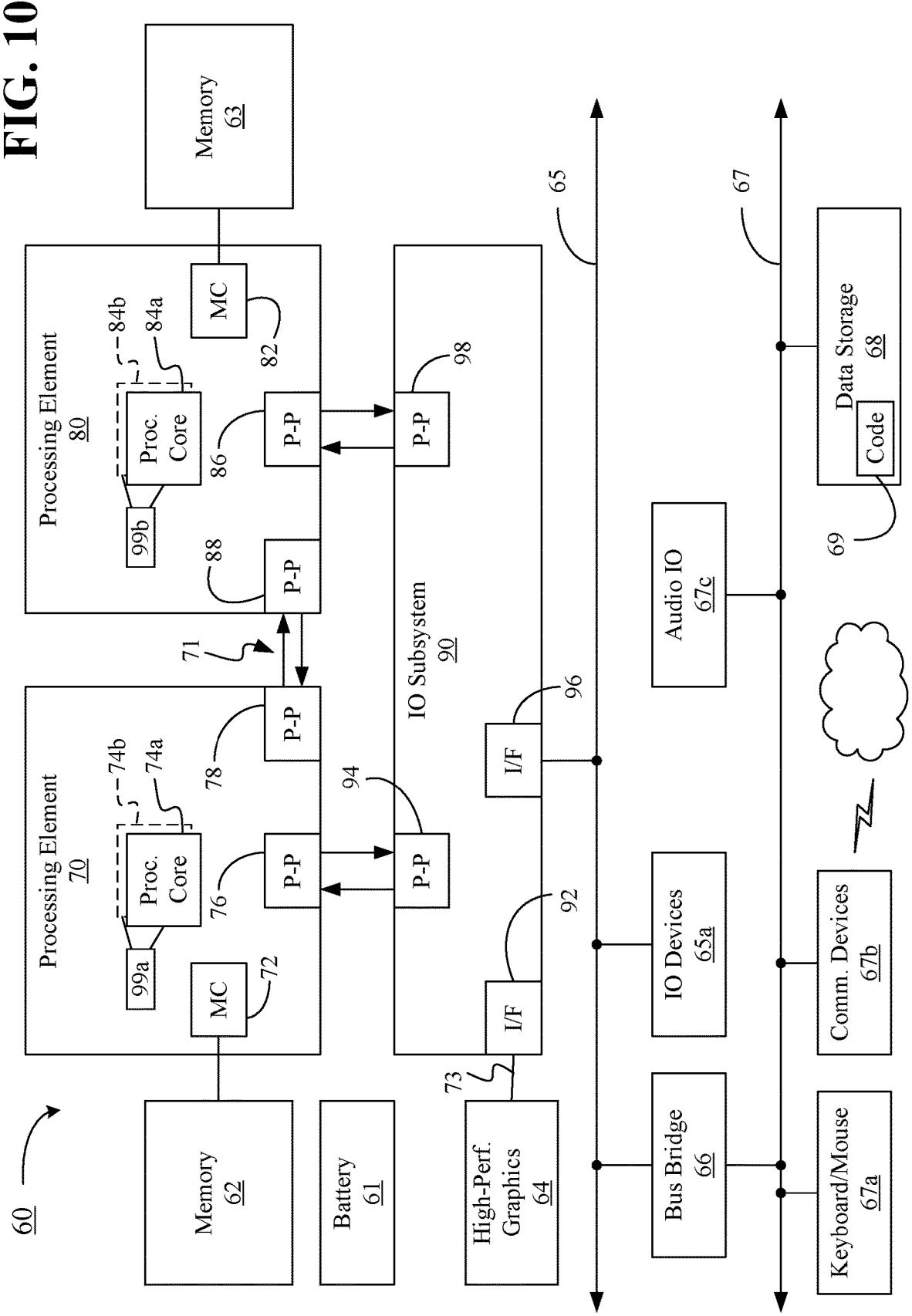
FIG. 10 is a block diagram illustrating an example of a multiprocessor-based computing system according to one or more embodiments.

FIG. 10 is a block diagram illustrating an example of a multi-processor based computing system 60 according to one or more embodiments, with reference to components and features described herein including but not limited to the figures and associated description. Multiprocessor system 60 includes a first processing element 70 and a second processing element 80. While two processing elements 70 and 80 are shown, it is to be understood that an embodiment of the system 60 may also include only one such processing element.

The system 60 is illustrated as a point-to-point interconnect system, wherein the first processing element 70 and the second processing element 80 are coupled via a point-to-point interconnect 71. It should be understood that any or all of the interconnects illustrated in FIG. 10 may be implemented as a multi-drop bus rather than point-to-point interconnect.

As shown in FIG. 10, each of the processing elements 70 and 80 may be multicore processors, including first and second processor cores (i.e., processor cores 74a and 74b and processor cores 84a and 84b). Such cores 74a, 74b, 84a, 84b may be configured to execute instruction code in a manner similar to that discussed above in connection with FIG. 9.

Each processing element 70, 80 may include at least one shared cache 99a, 99b. The shared cache 99a, 99b may store data (e.g., instructions) that are utilized by one or more components of the processor, such as the cores 74a, 74b and 84a, 84b, respectively. For example, the shared cache 99a, 99b may locally cache data stored in a memory 62, 63 for faster access by components of the processor. In one or more embodiments, the shared cache 99a, 99b may include one or more mid-level caches, such as level 2 (L2), level 3 (L3), level 4 (L4), or other levels of cache, a last level cache (LLC), and/or combinations thereof.

While shown with only two processing elements 70, 80, it is to be understood that the scope of the embodiments are not so limited. In other embodiments, one or more additional processing elements may be present in a given processor. Alternatively, one or more of the processing elements 70, 80 may be an element other than a processor, such as an accelerator or a field programmable gate array. For example, additional processing element(s) may include additional processors(s) that are the same as a first processor 70, additional processor(s) that are heterogeneous or asymmetric to processor a first processor 70, accelerators (such as, e.g., graphics accelerators or digital signal processing (DSP) units), field programmable gate arrays, or any other processing element. There can be a variety of differences between the processing elements 70, 80 in terms of a spectrum of metrics of merit including architectural, micro architectural, thermal, power consumption characteristics, and the like. These differences may effectively manifest themselves as asymmetry and heterogeneity amongst the processing elements 70, 80. For at least one embodiment, the various processing elements 70, 80 may reside in the same die package.

The first processing element 70 may further include memory controller logic (MC) 72 and point-to-point (P-P) interfaces 76 and 78. Similarly, the second processing element 80 may include a MC 82 and P-P interfaces 86 and 88. As shown in FIG. 10, MC's 72 and 82 couple the processors to respective memories, namely a memory 62 and a memory 63, which may be portions of main memory locally attached to the respective processors. While the MC 72 and 82 is illustrated as integrated into the processing elements 70, 80, for alternative embodiments the MC logic may be discrete logic outside the processing elements 70, 80 rather than integrated therein.

The first processing element 70 and the second processing element 80 may be coupled to an I/O subsystem 90 via P-P interconnects 76 and 86, respectively. As shown in FIG. 10, the I/O subsystem 90 includes P-P interfaces 94 and 98. Furthermore, the I/O subsystem 90 includes an interface 92 to couple the I/O subsystem 90 with a high performance graphics engine 64. In one embodiment, a bus 73 may be used to couple the graphics engine 64 to the I/O subsystem 90. Alternately, a point-to-point interconnect may couple these components.

In turn, the I/O subsystem 90 may be coupled to a first bus 65 via an interface 96. In one embodiment, the first bus 65 may be a Peripheral Component Interconnect (PCI) bus, or a bus such as a PCI Express bus or another third generation I/O interconnect bus, although the scope of the embodiments are not so limited.

As shown in FIG. 10, various I/O devices 65a (e.g., biometric scanners, speakers, cameras, sensors) may be coupled to the first bus 65, along with a bus bridge 66 which may couple the first bus 65 to a second bus 67. In one embodiment, the second bus 67 may be a low pin count (LPC) bus. Various devices may be coupled to the second bus 67 including, for example, a keyboard/mouse 67a, communication device(s) 67b, and a data storage unit 68 such as a disk drive or other mass storage device which may include code 69, in one embodiment. The illustrated code 69 may implement one or more aspects of the processes described above, including the process 600 for as described herein with reference to FIG. 6. The illustrated code 69 may be similar to the code 42 (FIG. 9), already discussed. Further, an audio I/O 67c may be coupled to the second bus 67 and a battery 61 may supply power to the computing system 60. The system 60 may implement one or more aspects of the computing system 100, the graph creation module, the embedding module, the universal graph attention module, and/or the learning module as described herein with reference to FIGS. 1-5.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

Embodiments of each of the above systems, devices, components and/or methods, including the system 10, the semiconductor apparatus 30, the processor core 40, the system 60, the computing system 100, the graph creation module, the embedding module, the universal graph attention module, the learning module, the process 600, and/or any other system components, may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of the foregoing systems and/or components and/or methods may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages.

Additional Notes and Examples

Example 1 includes a computing system comprising a memory to store compiled program code, the code including a plurality of intermediate representation (IR) code instructions, a processor coupled to the memory, the processor including one or more substrates and logic coupled to the one or more substrates, wherein the logic is implemented at least partly in one or more of configurable logic or fixed-functionality hardware logic, the logic coupled to the one or more substrates to generate a dependence graph based on the plurality of IR code instructions, generate a set of graph embedding vectors based on the plurality of IR code instructions, and determine, via a graph attention neural network, one of an analysis of the compiled program code or an enhancement of the compiled program code based on the dependence graph and the set of graph embedding vectors, wherein the graph attention neural network comprises a recurrent block and a task-specific neural network layer, the recurrent block comprising a graph attention layer and a transition function, and wherein the number of recurring steps for each position in the recurrent block is determined automatically.

Example 2 includes the computing system of Example 1, wherein the dependence graph is to map dependencies between instructions in the plurality of IR code instructions, and wherein each graph embedding vector is to model as a graph an operation, an associated argument and an associated argument type for an instruction of the plurality of IR code instructions.

Example 3 includes the computing system of Example 1, wherein the transition function comprises a fully-connected neural network layer.

Example 4 includes the computing system of Example 1, wherein the logic coupled to the one or more substrates is to apply dynamic per-position recurrence-halting to determine the number of recurring steps for each position in the recurrent block based on adaptive computation time.

Example 5 includes the computing system of Example 1, wherein the analysis of the compiled program code includes one of a software classification analysis, a thread coarsening analysis, or a heterogeneous scheduling analysis, and wherein the enhancement of the program code includes program modifications to improve performance via at least one of loop vectoring or optimization pass ordering.

Example 6 includes the computing system of any of Examples 1-5, further comprising a learning module to train the graph attention neural network, the learning module comprising one of a training neural network trained for classification or regression, or a deep reinforcement learning agent trained using a reward mechanism that favors solving a desired task.

Example 7 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to generate a dependence graph based on a plurality of intermediate representation (IR) code instructions associated with a compiled program code, generate a set of graph embedding vectors based on the plurality of IR code instructions, and determine, via a graph attention neural network, one of an analysis of the compiled program code or an enhancement of the compiled program code based on the dependence graph and the set of graph embedding vectors, wherein the graph attention neural network comprises a recurrent block and a task-specific neural network layer, the recurrent block comprising a graph attention layer and a transition function, and wherein the number of recurring steps for each position in the recurrent block is determined automatically.

Example 8 includes the apparatus of Example 7, wherein the dependence graph is to map dependencies between instructions in the plurality of IR code instructions, and wherein each graph embedding vector is to model as a graph an operation, an associated argument and an associated argument type for an instruction of the plurality of IR code instructions.

Example 9 includes the apparatus of Example 7, wherein the transition function comprises a fully-connected neural network layer.

Example 10 includes the apparatus of Example 7, wherein the logic coupled to the one or more substrates is to apply dynamic per-position recurrence-halting to determine the number of recurring steps for each position in the recurrent block based on adaptive computation time.

Example 11 includes the apparatus of Example 7, wherein the analysis of the compiled program code includes one of a software classification analysis, a thread coarsening analysis, or a heterogeneous scheduling analysis, and wherein the enhancement of the program code includes program modifications to improve performance via at least one of loop vectoring or optimization pass ordering.

Example 12 includes the apparatus of any of Examples 7-11, wherein a learning module is to train the graph attention neural network, the learning module comprising one of a training neural network trained for classification or regression, or a deep reinforcement learning agent trained using a reward mechanism that favors solving a desired task.

Example 13 includes the apparatus of Example 7, wherein the logic coupled to the one or more substrates includes transistor channel regions that are positioned within the one or more substrates.

Example 14 includes at least one non-transitory computer readable storage medium comprising a set of instructions which, when executed by a computing system, cause the computing system to generate a dependence graph based on a plurality of intermediate representation (IR) code instructions associated with a compiled program code, generate a set of graph embedding vectors based on the plurality of IR code instructions, and determine, via a graph attention neural network, one of an analysis of the compiled program code or an enhancement of the compiled program code based on the dependence graph and the set of graph embedding vectors, wherein the graph attention neural network comprises a recurrent block and a task-specific neural network layer, the recurrent block comprising a graph attention layer and a transition function, and wherein the number of recurring steps for each position in the recurrent block is determined automatically.

Example 15 includes the at least one non-transitory computer readable storage medium of Example 14, wherein the dependence graph is to map dependencies between instructions in the plurality of IR code instructions, and wherein each graph embedding vector is to model as a graph an operation, an associated argument and an associated argument type for an instruction of the plurality of IR code instructions.

Example 16 includes the at least one non-transitory computer readable storage medium of Example 14, wherein the transition function comprises a fully-connected neural network layer.

Example 17 includes the at least one non-transitory computer readable storage medium of Example 14, wherein the instructions, when executed, cause the computing system to apply dynamic per-position recurrence-halting to determine the number of recurring steps for each position in the recurrent block based on adaptive computation time.

Example 18 includes the at least one non-transitory computer readable storage medium of Example 14, wherein the analysis of the compiled program code includes one of a software classification analysis, a thread coarsening analysis, or a heterogeneous scheduling analysis, and wherein the enhancement of the program code includes program modifications to improve performance via at least one of loop vectoring or optimization pass ordering.

Example 19 includes the at least one non-transitory computer readable storage medium of any of Examples 14-18, wherein a learning module is to train the graph attention neural network, the learning module comprising one of a training neural network trained for classification or regression, or a deep reinforcement learning agent trained using a reward mechanism that favors solving a desired task.

Example 20 includes a method of analyzing and enhancing computer software programs, comprising generating a dependence graph based on a plurality of intermediate representation (IR) code instructions associated with a compiled program code, generating a set of graph embedding vectors based on the plurality of IR code instructions, and determining, via a graph attention neural network, one of an analysis of the compiled program code or an enhancement of the compiled program code based on the dependence graph and the set of graph embedding vectors, wherein the graph attention neural network comprises a recurrent block and a task-specific neural network layer, the recurrent block comprising a graph attention layer and a transition function, and wherein the number of recurring steps for each position in the recurrent block is determined automatically.

Example 21 includes the method of Example 20, wherein the dependence graph maps dependencies between instructions in the plurality of IR code instructions, and wherein each graph embedding vector models as a graph an operation, an associated argument and an associated argument type for an instruction of the plurality of IR code instructions.

Example 22 includes the method of Example 20, wherein the transition function comprises a fully-connected neural network layer.

Example 23 includes the method of Example 20, further comprising applying dynamic per-position recurrence-halting to determine the number of recurring steps for each position in the recurrent block based on adaptive computation time.

Example 24 includes the method of Example 20, wherein the analysis of the compiled program code includes one of a software classification analysis, a thread coarsening analysis, or a heterogeneous scheduling analysis, and wherein the enhancement of the program code includes program modifications to improve performance via at least one of loop vectoring or optimization pass ordering.

Example 25 includes the method of any of Examples 20-24, wherein a learning module is used to train the graph attention neural network, the learning module comprising one of a training neural network trained for classification or regression, or a deep reinforcement learning agent trained using a reward mechanism that favors solving a desired task.

Example 26 includes an apparatus comprising means for performing the method of any of Examples 20-24.

Thus, the adaptive technology described herein provides for automatically enhancing program execution or automatically identifying and classifying certain types of program code. The technology is language-agnostic and thus can analyze a wider range of code (e.g., code originating from C, C++, Fortran, OpenCL, etc. programs). Additionally, the technology generalizes to machine instructions that were not seen during training, thus making the system more robust at inference time and reducing the amount and the variability of the required training data. Further, the technology includes an automated neural network architecture selection mechanism based on a graph attention network that is designed to fully utilize the code structure and reduce the number of hyperparameters to be tuned at training time.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a memory to store compiled program code, the code including a plurality of intermediate representation (IR) code instructions;
a processor coupled to the memory, the processor including one or more substrates and logic coupled to the one or more substrates, wherein the logic is implemented at least partly in one or more of configurable logic or fixed-functionality hardware logic, the logic coupled to the one or more substrates to:
generate during inference a dependence graph based on the plurality of IR code instructions;
generate during inference a set of graph embedding vectors based on the plurality of IR code instructions, wherein the embedding vectors are generated independently of the dependence graph, and wherein each graph embedding vector is to model as a graph an operation, an associated argument and an associated argument type for an instruction of the plurality of IR code instructions;
apply dynamic per-position recurrence-halting using adaptive computation time to determine the number of recurring steps for each position in the recurrent block; and
perform during inference, via a graph attention neural network, one of an analysis of the compiled program code or an enhancement of the compiled program code based on the dependence graph and the set of graph embedding vectors, wherein the graph attention neural network comprises a recurrent block and a task-specific neural network layer, the recurrent block comprising a graph attention layer and a transition function, and wherein the number of recurring steps for each position in the recurrent block is determined automatically.

2. The computing system of claim 1, wherein the dependence graph is to map dependencies between instructions in the plurality of IR code instructions.

3. The computing system of claim 1, wherein the transition function comprises a fully-connected neural network layer.

4. The computing system of claim 1, wherein when performed, the analysis of the compiled program code includes one of a software classification analysis, a thread coarsening analysis, or a heterogeneous scheduling analysis, and wherein when performed, the enhancement of the program code includes program modifications to improve performance via at least one of loop vectoring or optimization pass ordering.

5. The computing system of claim 1, further comprising a learning module to train the graph attention neural network, the learning module comprising one of a training neural network trained for classification or regression, or a deep reinforcement learning agent trained using a reward mechanism that favors solving a desired task.

6. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
generate during inference a dependence graph based on a plurality of intermediate representation (IR) code instructions associated with a compiled program code;
generate during inference a set of graph embedding vectors based on the plurality of IR code instructions, wherein the embedding vectors are generated independently of the dependence graph, and wherein each graph embedding vector is to model as a graph an operation, an associated argument and an associated argument type for an instruction of the plurality of IR code instructions;
apply dynamic per-position recurrence-halting using adaptive computation time to determine the number of recurring steps for each position in the recurrent block; and
perform during inference, via a graph attention neural network, one of an analysis of the compiled program code or an enhancement of the compiled program code based on the dependence graph and the set of graph embedding vectors, wherein the graph attention neural network comprises a recurrent block and a task-specific neural network layer, the recurrent block comprising a graph attention layer and a transition function, and wherein the number of recurring steps for each position in the recurrent block is determined automatically.

7. The semiconductor apparatus of claim 6, wherein the dependence graph is to map dependencies between instructions in the plurality of IR code instructions.

8. The semiconductor apparatus of claim 6, wherein the transition function comprises a fully-connected neural network layer.

9. The semiconductor apparatus of claim 6, wherein when performed, the analysis of the compiled program code includes one of a software classification analysis, a thread coarsening analysis, or a heterogeneous scheduling analysis, and wherein when performed, the enhancement of the program code includes program modifications to improve performance via at least one of loop vectoring or optimization pass ordering.

10. The semiconductor apparatus of claim 6, wherein a learning module is to train the graph attention neural network, the learning module comprising one of a training neural network trained for classification or regression, or a deep reinforcement learning agent trained using a reward mechanism that favors solving a desired task.

11. The semiconductor apparatus of claim 6, wherein the logic coupled to the one or more substrates includes transistor channel regions that are positioned within the one or more substrates.

12. At least one non-transitory computer readable storage medium comprising a set of instructions which, when executed by a computing system, cause the computing system to:
   generate during inference a dependence graph based on a plurality of intermediate representation (IR) code instructions associated with a compiled program code;
   generate during inference a set of graph embedding vectors based on the plurality of IR code instructions, wherein the embedding vectors are generated independently of the dependence graph, and wherein each graph embedding vector is to model as a graph an operation, an associated argument and an associated argument type for an instruction of the plurality of IR code instructions;
   apply dynamic per-position recurrence-halting using adaptive computation time to determine the number of recurring steps for each position in the recurrent block; and
   perform during inference, via a graph attention neural network, one of an analysis of the compiled program code or an enhancement of the compiled program code based on the dependence graph and the set of graph embedding vectors, wherein the graph attention neural network comprises a recurrent block and a task-specific neural network layer, the recurrent block comprising a graph attention layer and a transition function, and wherein the number of recurring steps for each position in the recurrent block is determined automatically.

13. The at least one non-transitory computer readable storage medium of claim 12, wherein the dependence graph is to map dependencies between instructions in the plurality of IR code instructions.

14. The at least one non-transitory computer readable storage medium of claim 12, wherein the transition function comprises a fully-connected neural network layer.

15. The at least one non-transitory computer readable storage medium of claim 12, wherein when performed, the analysis of the compiled program code includes one of a software classification analysis, a thread coarsening analysis, or a heterogeneous scheduling analysis, and wherein when performed, the enhancement of the program code includes program modifications to improve performance via at least one of loop vectoring or optimization pass ordering.

16. The at least one non-transitory computer readable storage medium of claim 12, wherein a learning module is to train the graph attention neural network, the learning module comprising one of a training neural network trained for classification or regression, or a deep reinforcement learning agent trained using a reward mechanism that favors solving a desired task.

17. A method of analyzing and enhancing computer software programs, comprising:
   generating during inference a dependence graph based on a plurality of intermediate representation (IR) code instructions associated with a compiled program code;
   generating during inference a set of graph embedding vectors based on the plurality of IR code instructions, wherein the embedding vectors are generated independently of the dependence graph, and wherein each graph embedding vector models as a graph an operation, an associated argument and an associated argument type for an instruction of the plurality of IR code instructions;
   applying dynamic per-position recurrence-halting using adaptive computation time to determine the number of recurring steps for each position in the recurrent block; and
   performing during inference, via a graph attention neural network, one of an analysis of the compiled program code or an enhancement of the compiled program code based on the dependence graph and the set of graph embedding vectors, wherein the graph attention neural network comprises a recurrent block and a task-specific neural network layer, the recurrent block comprising a graph attention layer and a transition function, and wherein the number of recurring steps for each position in the recurrent block is determined automatically.

18. The method of claim 17, wherein the dependence graph maps dependencies between instructions in the plurality of IR code instructions.

19. The method of claim 17, wherein the transition function comprises a fully-connected neural network layer.

20. The method of claim 17, wherein when performed, the analysis of the compiled program code includes one of a software classification analysis, a thread coarsening analysis, or a heterogeneous scheduling analysis, and wherein when performed, the enhancement of the program code includes program modifications to improve performance via at least one of loop vectoring or optimization pass ordering.

21. The method of claim 17, wherein a learning module is used to train the graph attention neural network, the learning module comprising one of a training neural network trained for classification or regression, or a deep reinforcement learning agent trained using a reward mechanism that favors solving a desired task.

* * * * *